United States Patent
Lee et al.

(10) Patent No.: US 7,493,090 B2
(45) Date of Patent: Feb. 17, 2009

(54) SYSTEM AND METHOD FOR FLEXIBLY CONFIGURING LENGTH OF NEIGHBOR BASE STATION INFORMATION IN BROADBAND WIRELESS ACCESS COMMUNICATION SYSTEM

(75) Inventors: Sung-Jin Lee, Suwon-si (KR); Chang-Hoi Koo, Seongnam-si (KR); Jung-Je Son, Seongnam-si (KR); Hyoung-Kyu Lim, Seoul (KR); Hyun-Jeong Kang, Seoul (KR); Yeong-Moon Son, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 441 days.

(21) Appl. No.: 11/268,296

(22) Filed: Nov. 4, 2005

(65) Prior Publication Data
US 2006/0121903 A1 Jun. 8, 2006

(30) Foreign Application Priority Data
Nov. 4, 2004 (KR) ...................... 10-2004-0089488

(51) Int. Cl.
*H04B 17/00* (2006.01)
(52) U.S. Cl. .................. 455/67.11; 455/561; 455/67.13; 455/436; 455/442; 455/63.1; 455/452.2; 455/464; 370/331; 370/333; 370/342; 370/395.21; 370/343
(58) Field of Classification Search .............. 455/67.11, 455/436, 438, 450, 439, 452.2, 442
See application file for complete search history.

(56) References Cited
U.S. PATENT DOCUMENTS

| | | | | |
|---|---|---|---|---|
| 5,991,626 | A * | 11/1999 | Hinz et al. | 455/436 |
| 6,600,758 | B1 * | 7/2003 | Mazur et al. | 370/508 |
| 6,782,274 | B1 * | 8/2004 | Park et al. | 455/552.1 |
| 7,092,711 | B2 * | 8/2006 | Masuda et al. | 455/439 |
| 7,096,030 | B2 * | 8/2006 | Huomo | 455/456.3 |
| 7,190,944 | B2 * | 3/2007 | Kim et al. | 455/346 |
| 7,251,490 | B2 * | 7/2007 | Rimoni | 455/436 |

(Continued)

FOREIGN PATENT DOCUMENTS

EP    1473956    11/2004

(Continued)

OTHER PUBLICATIONS

IEEE, Optimization of MOB-NBR_ADV Message, Nov. 4, 2004.

(Continued)

*Primary Examiner*—Marceau Milord
(74) *Attorney, Agent, or Firm*—The Farrell Law Firm, P.C.

(57) ABSTRACT

A broadband wireless access communication system including a serving BS which broadcasts a MOB_NBR-ADV message to an MS is provided. A method for configuring the MOB_NBR-ADV message is also provided, and includes adding a specific field, which represents whether at least one information field constituting the MOB_NBR-ADV message exists, to the MOB_NBR-ADV message, determining if at least one information field is included in the MOB_NBR-ADV message, and determining a bit value of the specific field according to whether at least one information field is included in the MOB_NBR-ADV message.

10 Claims, 10 Drawing Sheets

U.S. PATENT DOCUMENTS

| | | | |
|---|---|---|---|
| 7,260,405 B2 * | 8/2007 | Kim et al. | 455/452.2 |
| 7,280,831 B2 * | 10/2007 | Moilanen et al. | 455/436 |
| 7,283,495 B2 * | 10/2007 | Lee et al. | 370/331 |
| 7,336,953 B2 * | 2/2008 | Kim et al. | 455/438 |
| 7,343,153 B1 * | 3/2008 | Kauhanen et al. | 455/416 |
| 7,376,424 B2 * | 5/2008 | Kim et al. | 455/436 |
| 2003/0147371 A1 | 8/2003 | Choi et al. | |
| 2004/0176094 A1 | 9/2004 | Kim et al. | |
| 2004/0185853 A1 | 9/2004 | Kim et al. | |
| 2005/0096051 A1 * | 5/2005 | Lee et al. | 455/438 |
| 2005/0197124 A1 * | 9/2005 | Kang et al. | 455/439 |
| 2007/0032255 A1 * | 2/2007 | Koo et al. | 455/512 |

FOREIGN PATENT DOCUMENTS

RU    2 144 732    5/1995

OTHER PUBLICATIONS

Geunhwi Lim et al., Fragmented Transmission of the MOB-NBR-ADV Message, Aug. 31, 2004.

* cited by examiner

FIG.1
(PRIOR ART)

| | | |
|---|---|---|
| MOB-NBR_ADV Message_Formant() { | | |
| Management message type = 53 | 8 bits | |
| Operator ID | 24 bits | Unique ID assigned to the operator |
| Configuration Change Count | 8 bits | Incremented each time the information for the associated neighbors BS has changed |
| Fragmentation Index | 4 bits | This field indicates the current fragmentation index. |
| Total Fragmentation | 4 bits | This field indicates the total number of fragmentations. |
| Skip-Optional-Fields Flag | 1 bits | If ser to '1'and if a neighbor has OFDMA PHY the BS-ID for that neighbor is omitted in this message. If set to '0', BS-ID is not omitted for any neighbor. |
| N_NEIGHBORS | 8 bits | |
| For (j=0;j<N_NEIGHBORS;j++){ | | |
| Length | 8 bits | Length of message information within the iteration of N_NEIGHBOR in bytes. |
| PHY Profile ID | 8 bits | Aggregated IDs of Co-located FA Indicator, FA Configuration Indicator, FFT size, Bandwidth, Operation Mode of the starting subchannelization of a frame, and Channel Number |
| if (FA Index indicator==1){ | | |
| FA Index | 8 bits | This field, Frequency Assignment Index, is present only the FA Index Indicator in PHY Profile ID is set. Otherwise, the neighbor BS has the same FA Index or the center frequency is indicated using the TLV encoded information. |
| } | | |
| if (BS EIRP indicator==1){ | | |

FIG.2A
(PRIOR ART)

| | | |
|---|---|---|
| BS EIRP | 8 bits | Signed Integer from −128 to 127 in unit of dBm This field is present only if the BS EIRP indicator is set in PHY Profile ID. Otherwise, the BS has the same EIRP as the serving BS. |
| } | 8 bits | |
| Neighbor BS-ID | 8 bits | This is an optional field for OFDMA PHY |
| Preamble Index | 4 bits | The index for the PHY profile specific preamble. Preamble Index is PHY specific for SCa and OFDMA. The value of Preamble Index shall be ignored and a value of '0x00' shall be used for OFDM PHY |
| HO Process Optimization | 8 bits | HO Process Optimization is provided as part of this message is indicative only. HO process requirements may change at time of actual HO. For each Bit location, a value of '0' indicates the associated reentry management messages shall be required, a value of '1' indicates the reentry management message may be omitted. Regardless of the HO Process Optimization TLV settings, the Target BS may send unsolicited SBC-RSP and/ or REG-RSP management messages Bit #0: Omit SBC-REQ/RSP management messages during current re-entry processing Bit #1: Omit PKM-REQ/RSP management message during current re-entry processing Bit #2: Omit REG-REQ/RSP management during current re-entry processing |

FIG.2B
(PRIOR ART)

| | | |
|---|---|---|
| | | Bit #3: Omit Network Address Acquisition management messages during current reentry processing<br>Bit #4: Omit Time of Day Acquisition management messages during current reentry processing<br>Bit #5: Omit TFTP management messages during current re-entry processing<br>Bit #6: Full service and operational state transfer or sharing between Serving BS and Target BS (ARQ, timers, counters, MAC state machines, etc) |
| Scheduling Service Supported | 4 bits | Bitmap to indicate if BS supports a particular scheduling service. '1' indicates support, '0' indicates not support:<br>bit 0: Unsolicited Grant Service (UGS)<br>bit 1: Real-time Polling Service (rtPS)<br>bit 2: Non-real-time Polling service (nrtPS)<br>bit 3: Best Effort value of '1111' indicates no information on service available |
| Available Radio Resource | 4 bits | Percentage of reported average available subchannels and symbols resources per frame<br>0000: 0%, 0001: 20%, 0010: 40%, 0011: 60%<br>0100: 80%, 0101: 100%, 0110-1110: reserved<br>0110-1110: reserved, value of '1111' indicates no information on service available |

FIG.2C
(PRIOR ART)

| | | |
|---|---|---|
| Handoff Neighbor Preference | 2 bits | 00 Normal<br>01 Preferred<br>10 Non-Preferred<br>11 Reserved |
| DCD Configuration Change Count | 3 bits | This represents the Neighbor BS current DCD configuration change count |
| UCD Configuration Change Count | 3 bits | This represents the Neighbor BS current UCD configuration change count |
| TLV Encoded Neighbor information | Variable | TLV specific |
| } | | |
| { | | |

FIG.2D
(PRIOR ART)

| | | |
|---|---|---|
| MOB-NBR_ADV Message_Formant() { | | |
| Management message type = 53 | 8 bits | |
| NBR_FLAG | 8 bits | Bit [0] : skip Operator ID<br>Bit [1] : skip NBR BS ID<br>Bit [2] : skip HO process optimization<br>Bit [3] : skip QoS supported<br>Bit [4] [7] : Reserved for the future use |
| If (NBR_FLAG[0]=0) { | | |
| Operator ID | 24 bits | Unique ID assigned to the operator |
| } | | |
| Configuration Change Count | 8 bits | Incremented each time the information for the associated neighbors BS has changed |
| Fragmentation Index | 4 bits | This field indicates the current fragmentation index. |
| Total Fragmentation | 4 bits | This field indicates the total number of fragmentations. |
| | | |
| N_NEIGHBORS | 6 bits | |
| For (j=0;j<N_NEIGHBORS;j++){ | | |
| Length | 8 bits | Length of message information within the iteration of N_NEIGHBOR in bytes. |
| PHY Profile ID | 8 bits | Aggregated IDs of Co-located FA Indicator, FA Configuration Indicator, FFT size, Bandwidth, Operation Mode of the starting subchannelization of a frame, and Channel Number |
| if (FA Index indicator==1){ | | |
| FA Index | 8 bits | This field, Frequency Assignment Index, is present only the FA Index Indicator in PHY Profile ID is set. Otherwise, the neighbor BS has the same FA Index or the center frequency is indicated using the TLV encoded information. |

FIG.3A

| | | |
|---|---|---|
| } | | |
| if (BS EIRP indicator==1){ | | |
| BS EIRP | 8 bits | Signed Integer from −128 to 127 in unit of dBm This field is present only if the BS EIRP indicator is set in PHY Profile ID. Otherwise, the BS has the same EIRP as the serving BS. |
| } | | |
| if (NBR_FLAG[1]=0) { | | |
| Neighbor BS-ID | 24 bits | This is an optional field for OFDMA PHY |
| } | | |
| Preamble Index | 8 bits | The index for the PHY profile specific preamble. Preamble Index is PHY specific for SCa and OFDMA. The value of Preamble Index shall be ignored and a value of '0x00' shall be used for OFDM PHY |
| if (NBR_FLAG[2]=0) { | | |
| HO Process Optimization | 8 bits | HO Process Optimization is provided as part of this message is indicative only. HO process requirements may change at time of actual HO. For each Bit location, a value of '0' indicates the associated reentry management messages shall be required, a value of '1' indicates the reentry management message may be omitted. Regardless of the HO Process Optimization TLV settings, the Target BS may send unsolicited SBC-RSP and/ or REG-RSP management messages Bit #0: Omit SBC-REQ/RSP management |

FIG.3B

| | | |
|---|---|---|
| | | messages during current re-entry processing<br>Bit #1: Omit PKM-REQ/RSP management message during current re-entry processing<br>Bit #2: Omit REG-REQ/RSP management during current re-entry processing<br>Bit #3: Omit Network Address Acquisition management messages during current reentry processing<br>Bit #4: Omit Time of Day Acquisition management messages during current reentry processing<br>Bit #5: Omit TFTP management messages during current re-entry processing<br>Bit #6: Full service and operational state transfer or sharing between Serving BS and Target BS (ARQ, timers, counters, MAC state machines, etc) |
| } | | |
| if (NBR-ADV[3]=0) { | | |
| Scheduling Service Supported | 4 bits | Bitmap to indicate if BS supports a particular scheduling service. '1' indicates support, '0' indicates not support:<br>bit 0: Unsolicited Grant Service (UGS)<br>bit 1: Real-time Polling Service (rtPS)<br>bit 2: Non-real-time Polling service (nrtPS)<br>bit 3: Best Effort value of '1111' indicates no information on service available |

FIG.3C

| | | |
|---|---|---|
| Available Radio Resource | 4 bits | Percentage of reported average available subchannels and symbols resources per frame<br>0000: 0%, 0001: 20%, 0010: 40%,<br>0011: 60%, 0100: 80%<br>0101: 100%, 0110-1110: reserved,<br>0110-1110: reserved<br>value of '1111' indicates no information on service available |
| Handoff Neighbor Preference | 2 bits | 00 Normal, 01 Preferred,<br>10 Non-Preferred, 11 Reserved |
| } | | |
| } | | |
| DCD Configuration Change Count | 3 bits | This represents the Neighbor BS current DCD configuration change count |
| UCD Configuration Change Count | 3 bits | This represents the Neighbor BS current UCD configuration change count |
| Padding for byte alignment | | |
| TLV Encoded Neighbor information | Varible | TLV specific |
| } | | |
| } | | |

SYSTEM AND METHOD FOR FLEXIBLY CONFIGURING LENGTH OF NEIGHBOR BASE STATION INFORMATION IN BROADBAND WIRELESS ACCESS COMMUNICATION SYSTEM

PRIORITY

This application claims priority to an application entitled "System and Method for Flexibly Configuring Length of Neighbor Base Station Information in Broadband Wireless Access Communication System" filed in the Korean Industrial Property Office on Nov. 4, 2004 and assigned Serial No. 2004-89488, the contents of which are incorporated herein by reference.

BACKGROUND OF THE INVENTION

1. Field of the Invention

The present invention relates to a broadband wireless access communication system, and more particularly to a system and a method for configuring a neighbor base station advertisement (hereinafter referred to as 'MOB_NBR-ADV') message including neighbor base station information.

2. Description of the Related Art

In a next generation communication system, that is, a $4^{th}$ generation (hereinafter referred to as '4G') communication system, much research has been undertaken to provide users with services which have various qualities of service (hereinafter referred to as 'QoS') and to support a transmission speed of about 100 Mbps. Particularly, in the current 4G communication system, research is being vigorously pursued to support high-speed services to broadband wireless access (hereinafter referred to as 'BWA') communication systems such as wireless local area network (hereinafter referred to as 'WLAN') communication systems and wireless metropolitan area network (hereinafter referred to as 'WMAN') communication systems by ensuring both mobility and various QoSs. A typical communication system for this purpose is an IEEE (Institute of Electrical and Electronics Engineers) 802.16 communication system.

The IEEE 802.16 communication system is a communication system which applies an orthogonal frequency division multiplexing (hereinafter referred to as 'OFDM')/orthogonal frequency division multiple access (hereinafter referred to as 'OFDMA') scheme in order to support a broadband transmission network to a physical channel of the WMAN system.

A structure of an IEEE 802.16 communication system will now be described with reference to FIG. 1, which schematically illustrates the common IEEE 802.16e communication system.

Figure 1:
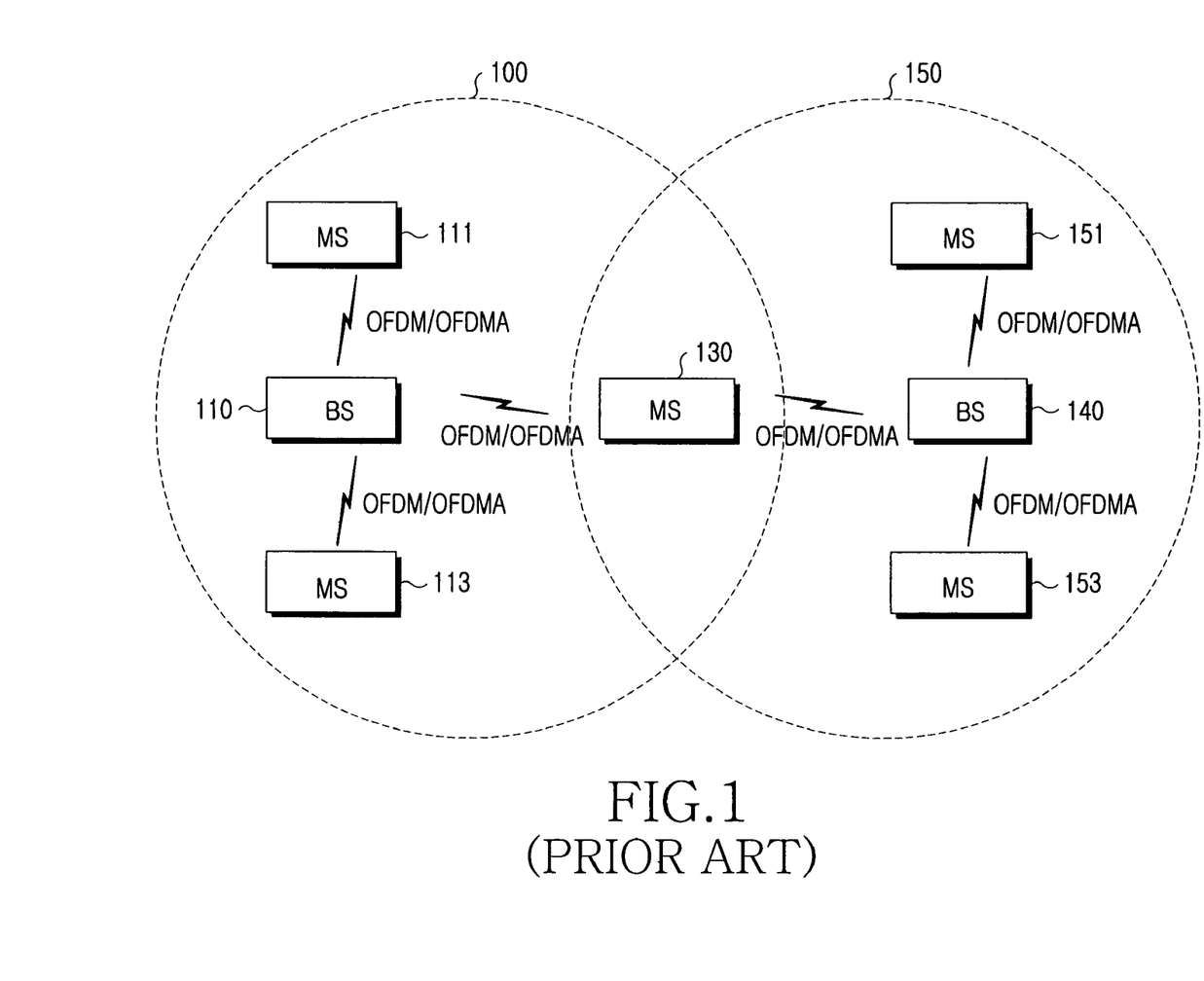
FIG. 1 is a schematic view illustrating a structure of a common IEEE 802.16e communication system.

Referring to FIG. 1, the IEEE 802/16e communication system has a multiple cell structure, for example, it has cells 100 and 150. The IEEE 802.16e communication system also includes a base station (hereinafter referred to as 'BS') 110 controlling the cell 100, a BS 140 controlling the cell 150, and a plurality of mobile stations (hereinafter referred to as 'MS') 111, 113, 130, 151, and 153. Signal transmission/reception between the BSs 110, 140 and the MSs 111, 113, 130, 151, and 153 is implemented using the OFDM/OFDMA scheme. In addition, from among the MSs 111, 113, 130, 151, and 153, the MS 130 exists in a boundary area between the cells 100 and 150, that is, a handover area. Thus, the BS 100 or the BS 150 must be capable of supporting handover of the MS 130.

For example, when the MS 130 moves to an area covered by the cell 150 while it communicates with the BS 110 in the cell 100, and the MS 130 undergoes handover to the BS 140, the MS 130 must conduct a network re-entry procedure with the BS 140. This is because the BS 110 and the BS 140 have different physical layers and different medium access control (hereinafter referred to as 'MAC') layer structures.

If an MS conducts a network re-entry procedure during handover from a serving BS, in which the MS is currently located, to a neighbor BS as stated above, a data service in transmission/reception is interrupted and must newly be started after the MS completes the handover to the neighbor BS. In order to handover to the neighbor BS in this way, the MS must be capable of recognizing neighbor BS information. The neighbor BS information may be recognized by receiving an MOB_NBR-ADV message which each BS periodically broadcasts.

Hereinafter, an MOB-NBR-ADV message format will be described with reference to FIGS. 2A and 2D, which illustrate a format of a common MOB_NBR-ADV message.

Figure 2A:
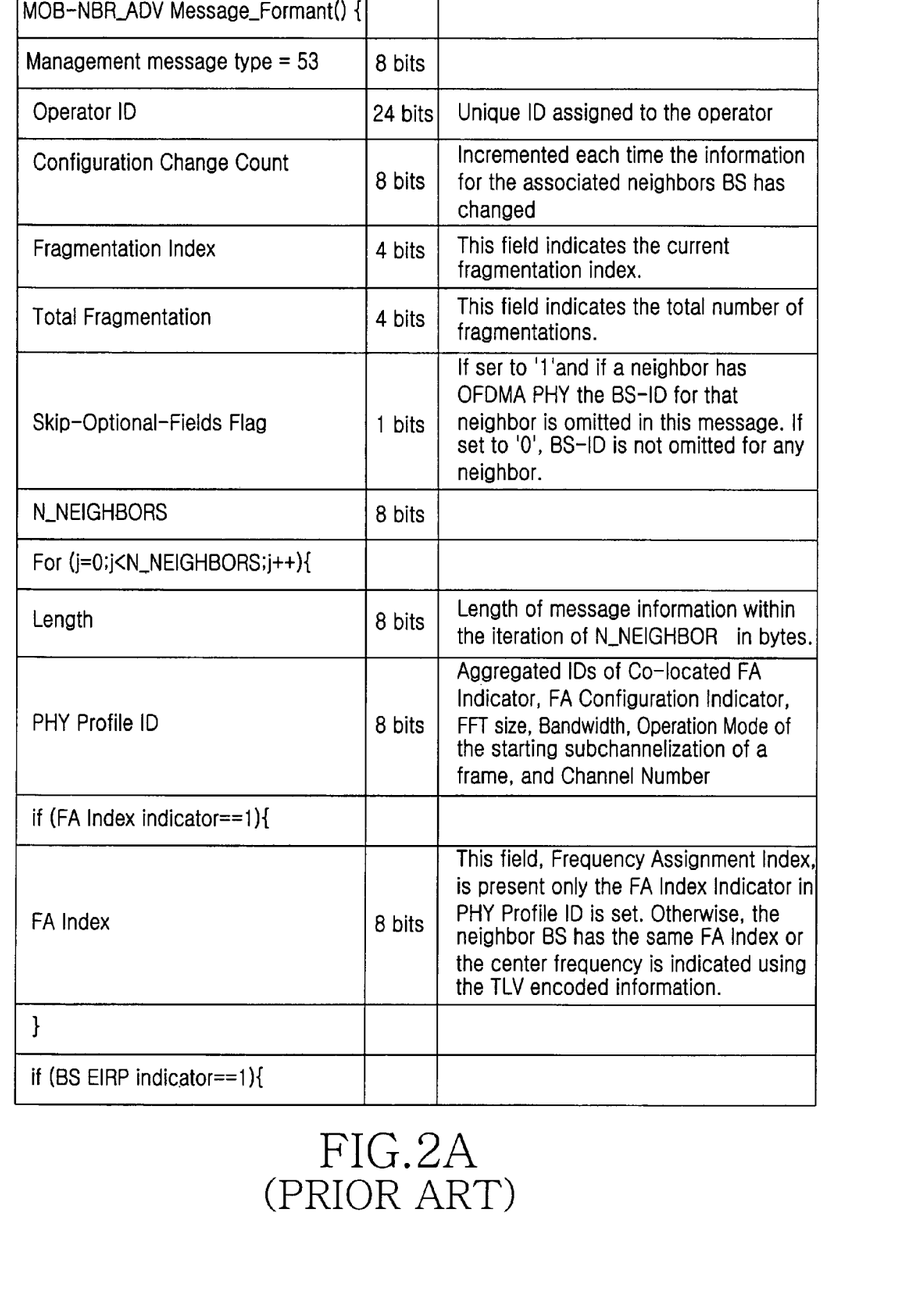
FIGS. 2A and 2D are views illustrating a format of a common MOB_NBR-ADV message.
Figure 2B:
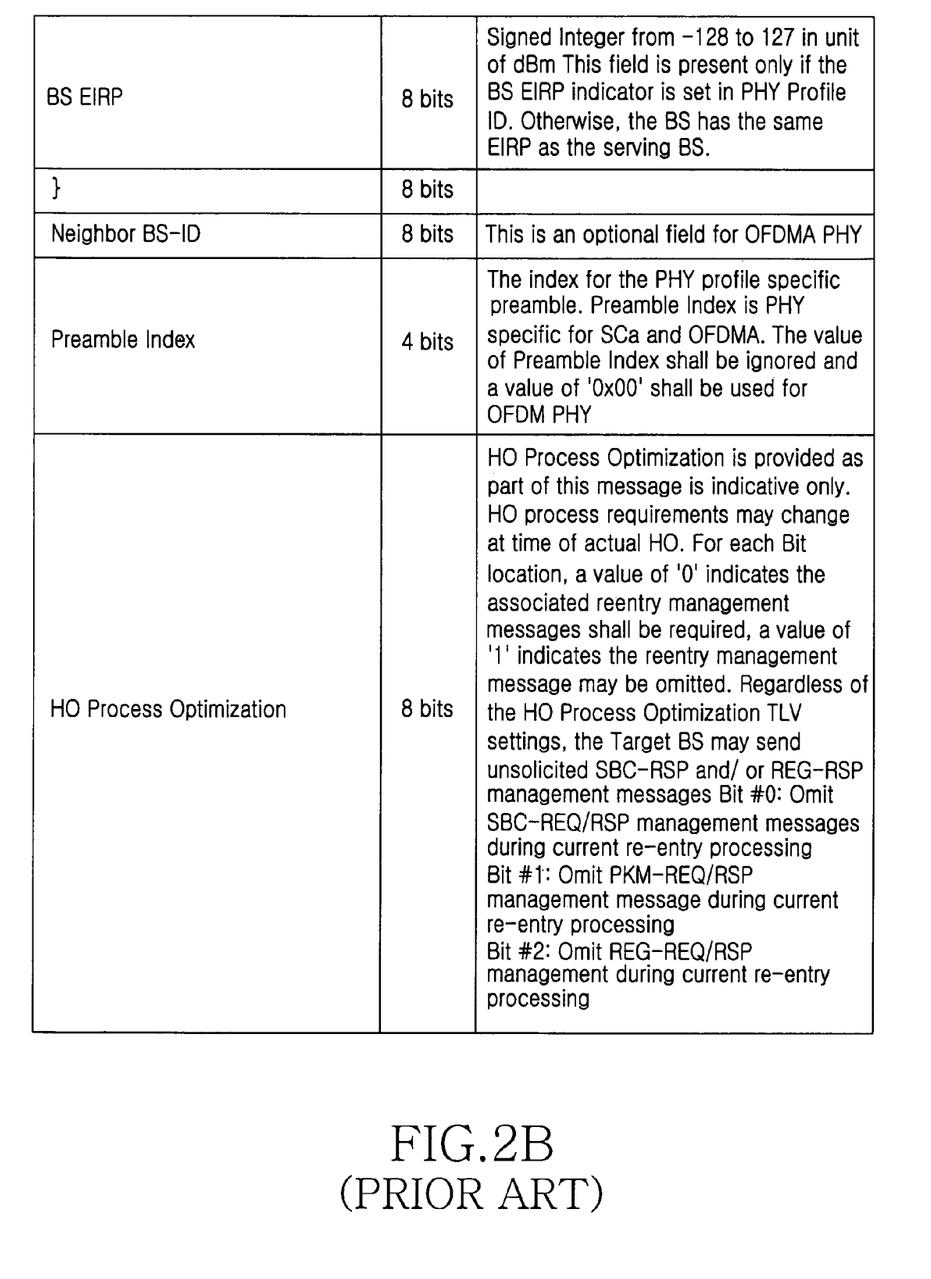
Figure 2C:
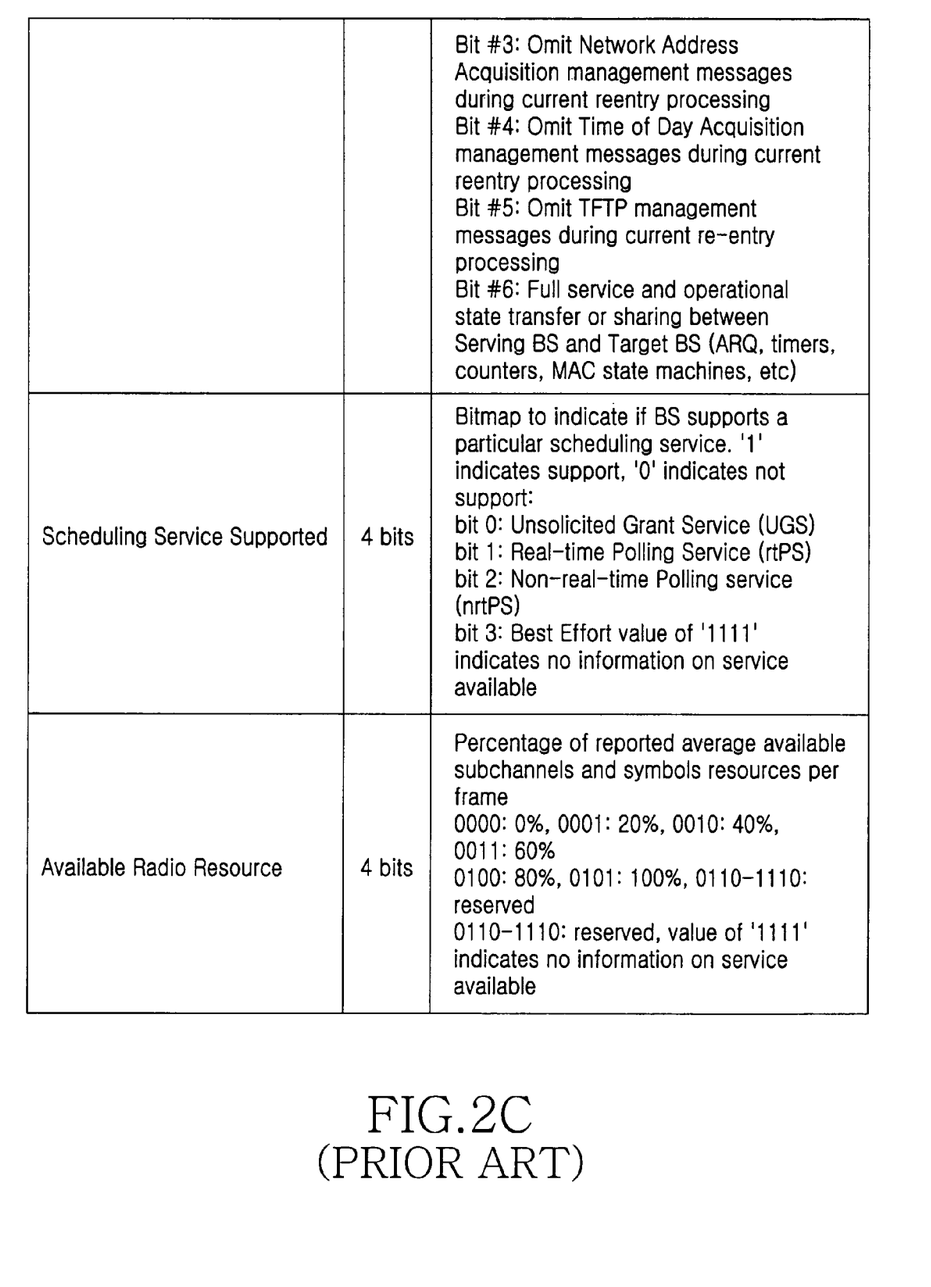
Figure 2D:
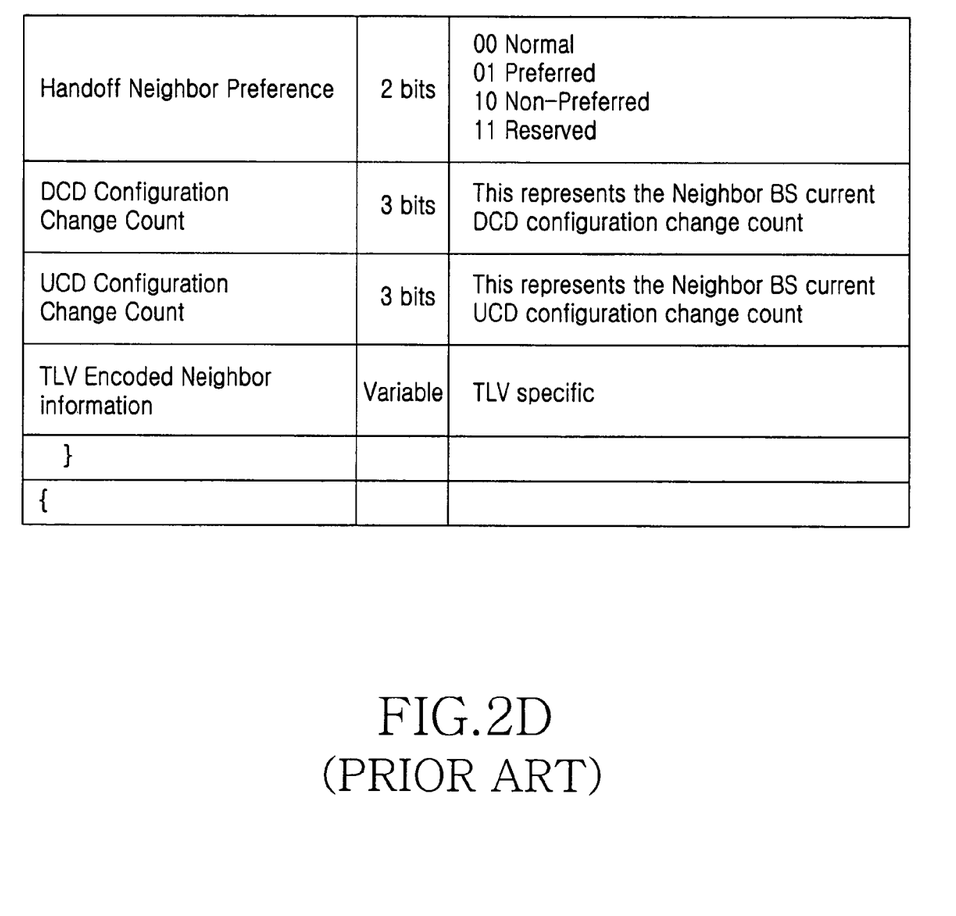
Figure 3A:
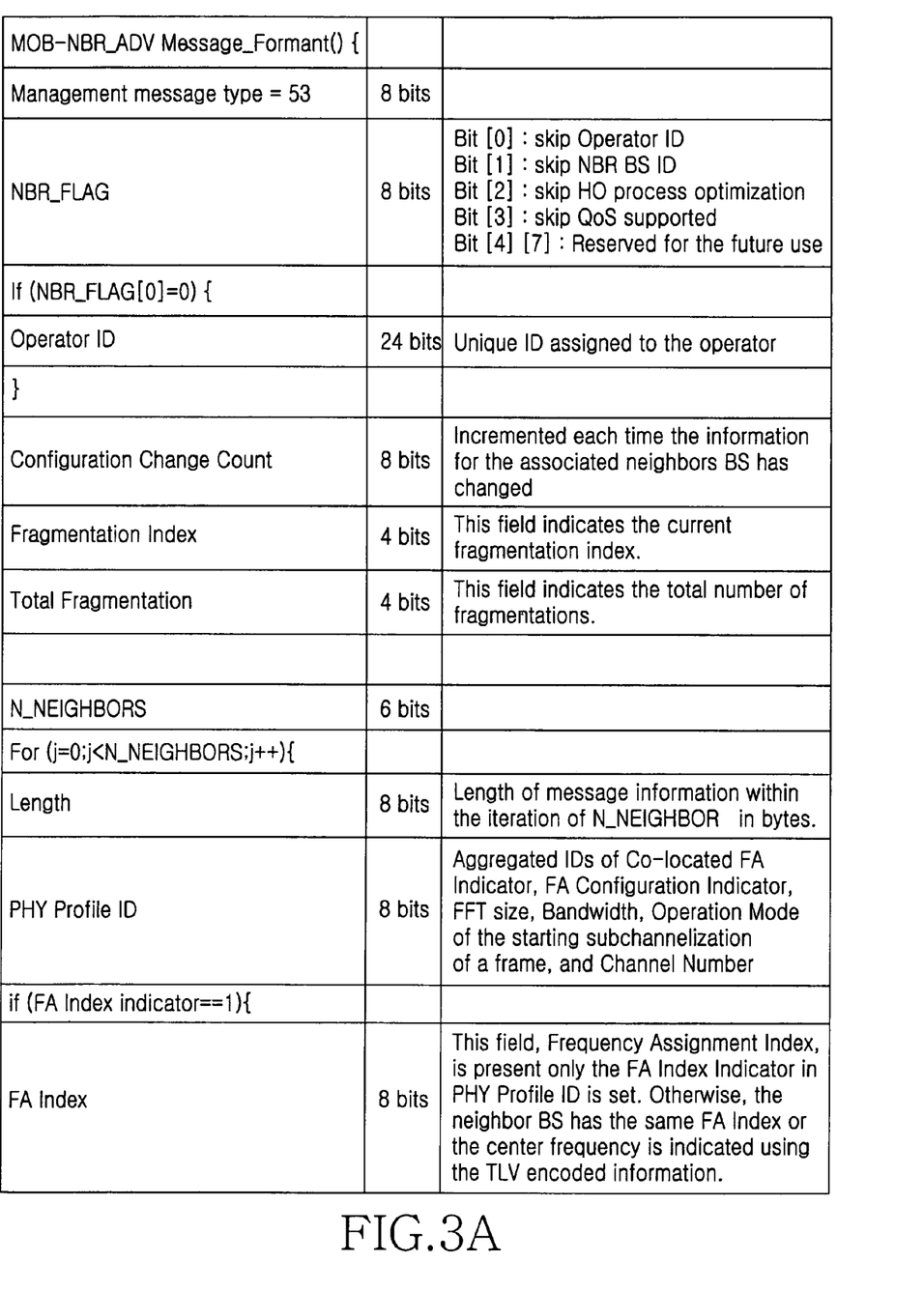
FIGS. 3A to 3D are views illustrating a format of a new MOB_NBR-ADV message in accordance with a preferred embodiment of the present invention.
Figure 3B:
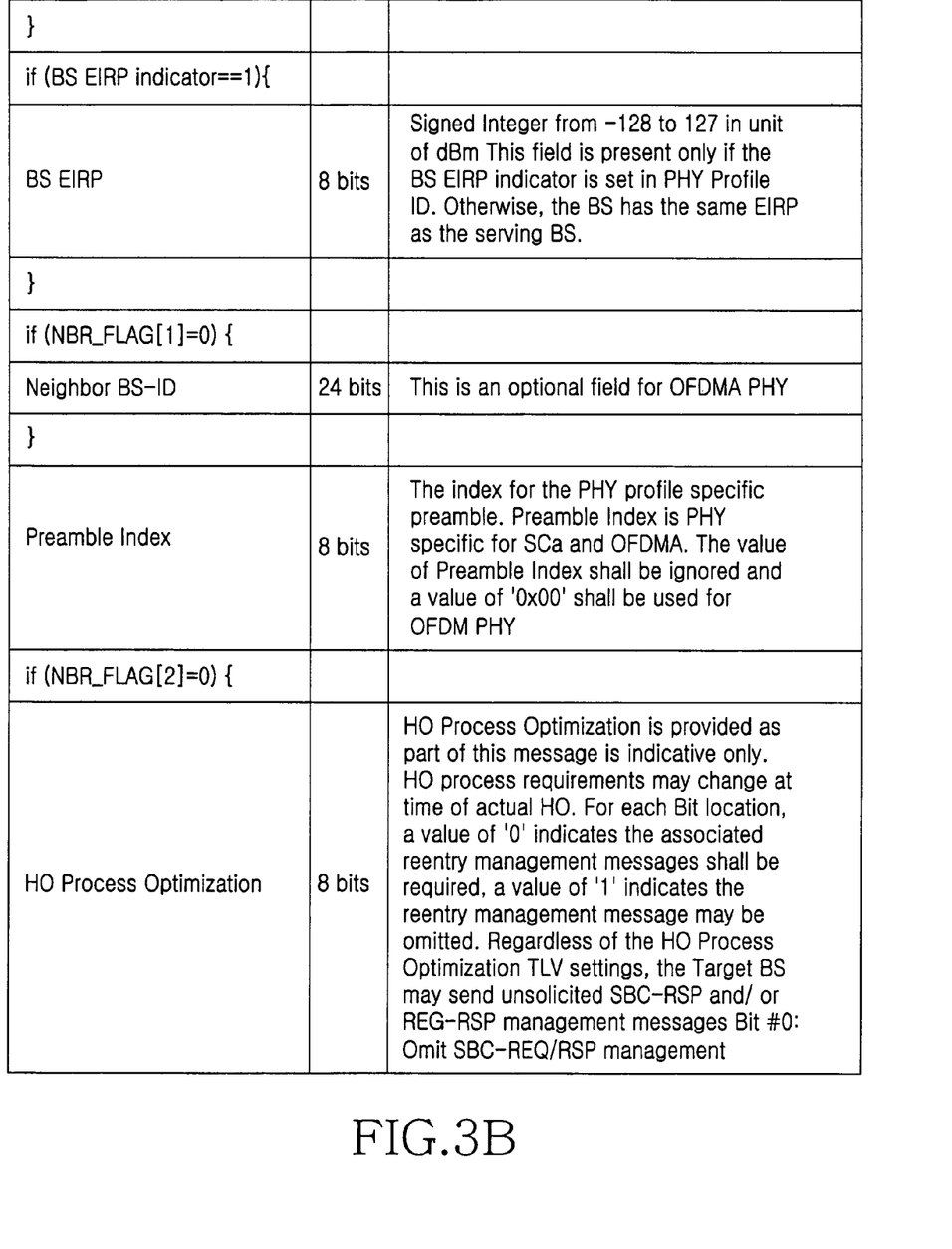
Figure 3C:
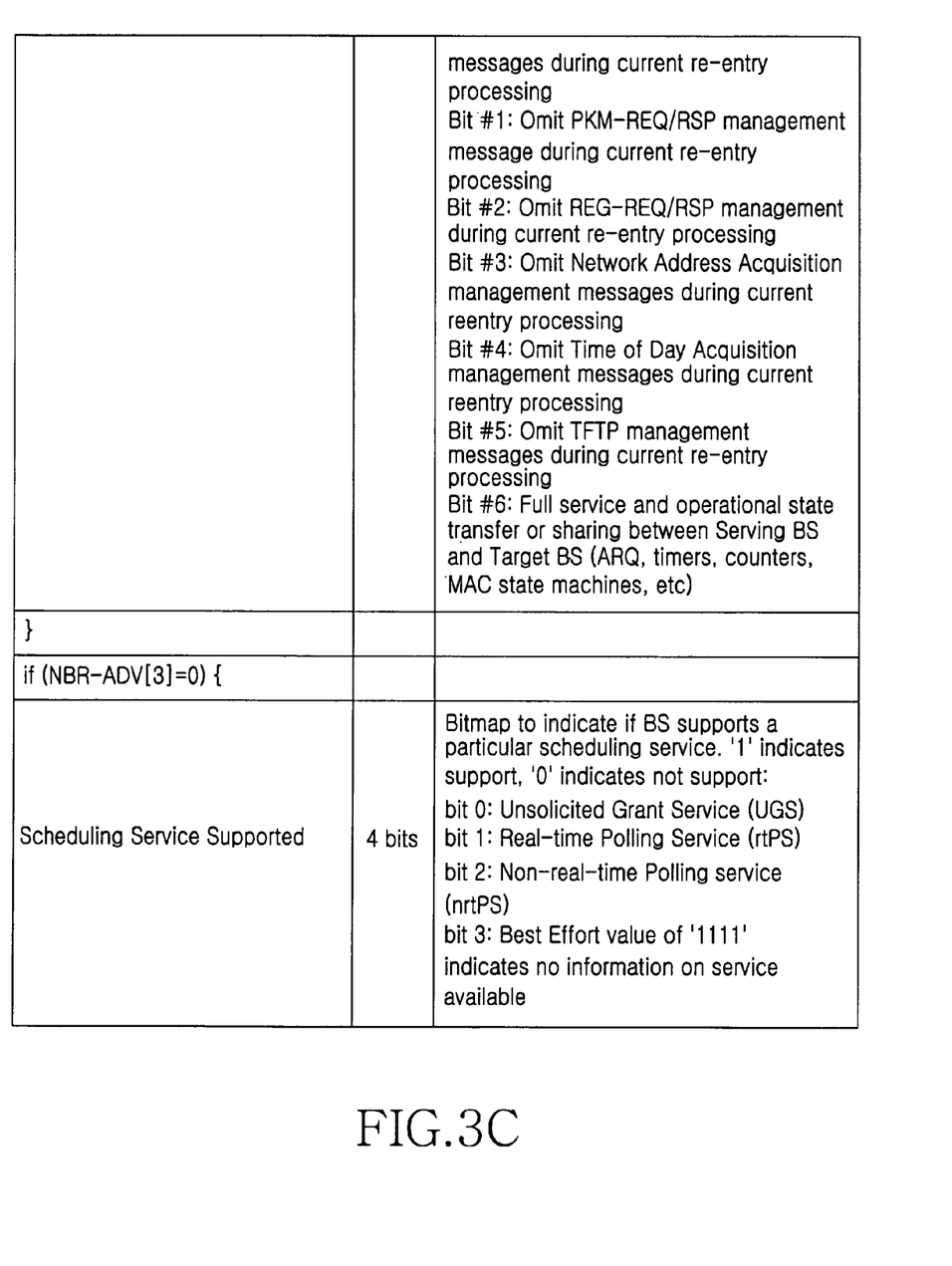
Figure 3D:
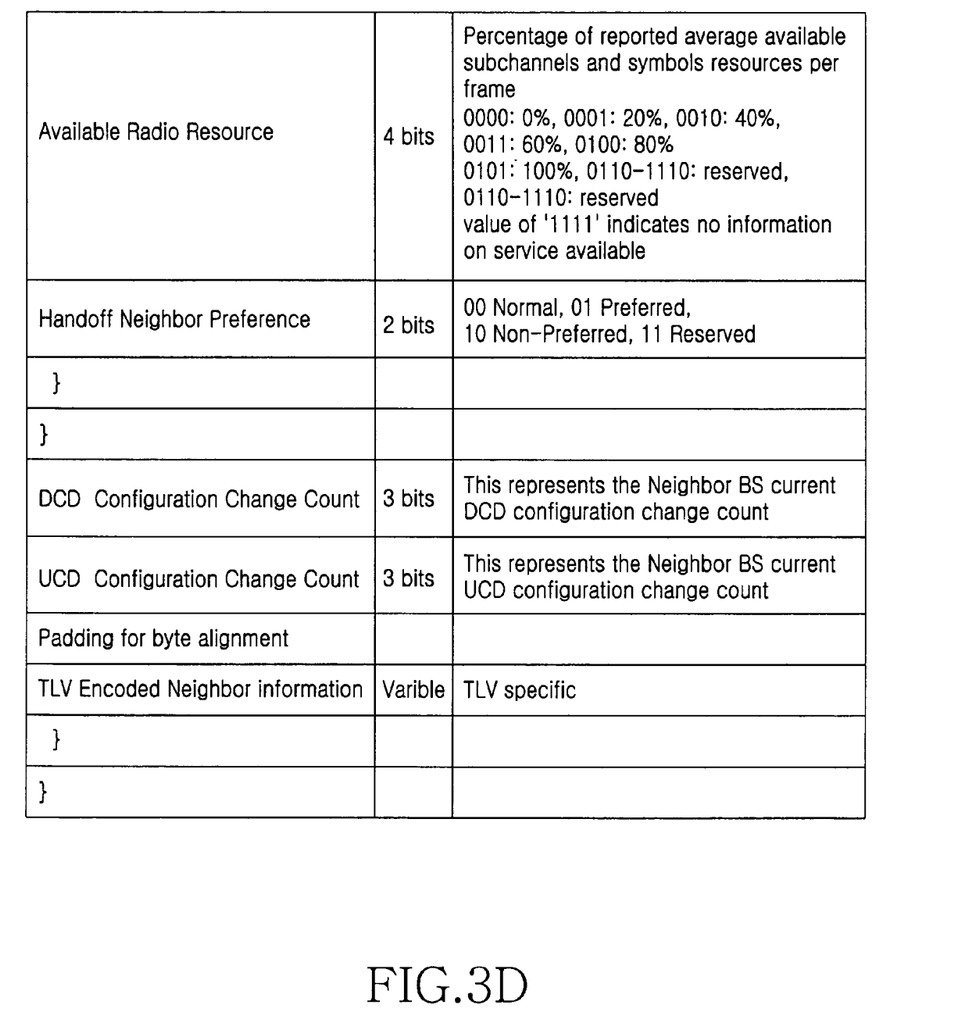

Referring to FIGS. 2A and 2D, the MOB_NBR-ADV message is configured of a plurality of information elements (hereinafter referred to as 'IE'), and the IEs are as follows:

Management Message Type: represents the type of a transmitted message:

Operator ID: represents an unique identifier assigned to a operator,

Configuration Change Count: each time message configuration changes, increases by 1 to indicate whether a corresponding message has changed;

Fragmentation Index: represents the number of times that a message is transmitted when the MOB_NBR-ADV message is fragmented and the fragmented messages are separately transmitted;

Total Fragmentation: represents the total number of fragmented messages;

Skip-Optional-Fields Flag: indicates a BS-ID when the BS-ID is omitted in a corresponding message;

N-NEIGHBORS: represents information on how many neighbor BSs are included in a current message; that is, it represents the number of neighbor BSs;

Length: represents information field length according to BS-Ids;

PHY Profile ID: indicates an information ID of a radio channel used in a corresponding BS;

FA Index: indicates an inherent ID representing a frequency allocated to a corresponding BS;

BS EIRP: represents transmission power intensity of a corresponding BS;

Neighbor BS-ID: indicates IDs of neighbor BSs;

Preamble Index: indicates an ID of a preamble to be used in a corresponding sector of a corresponding BS;

HO Process Optimization: dividedly indicates information about indispensable procedures and information about omissible procedures during handover to a corresponding BS;

Scheduling Service Supported: indicates QoS classes supportable by a corresponding BS, from among various QoS classes predefined between BSs;

Available Radio Resource: indicates the degree of availability of radio channel resources of a corresponding BS;

Handoff Neighbor Preference: defines the degree of logical preference when a serving BS controls an MS to handover to a neighbor BS;

DCD Configuration Change Count: indicates the DCD (Downlink Channel Descriptor) information serial number of a corresponding neighbor BS;

UCD Configuration Change Count: indicates the UCD (Uplink Channel Descriptor) information serial number of a corresponding neighbor BS;

Other neighbor information (hereinafter referred to as 'TLV (Type/Length/Value) Encoded Neighbor Information'): represents all information related to a neighbor BS other than the aforementioned information.

Now, the MOB_NBR-ADV message will be described in more detail.

The MS, having received the MOB_NBR-ADV message periodically broadcasted from the serving BS, can acquire scanning information for measuring signal intensities of neighbor BSs. The MS can identify neighbor BSs by using Neighbor BS-ID information included in the MOB_NBR-ADV message, and thus comes to recognize physical frequency band search information, which is necessary for scanning the neighbor BSs, through the Physical Frequency field. In this way, the serving BS periodically broadcasts the MOB_NBR-ADV message to provide information which the MS requires for handover.

Therefore, the conventional MOB_NBR-ADV message includes a lot of information, and its large size is problematic.

Here, the MS may require, or may not necessarily require, the information included in the MOB_NBR-ADV depending on the present circumstances. Also, the MOB_NBR-ADV message is not a message which is transmitted to a specific MS, but is a broadcast message which is repeatedly transmitted to many unspecified MSs in very short cycles. On account of this, bandwidth consumption in a radio channel section is very large. In the end, there is a problem in that radio channel resources are wasted because a network operator must include unnecessary information in the MOB_NBR-ADV message.

SUMMARY OF THE INVENTION

Accordingly, the present invention has been made to solve at least the above-mentioned problems occurring in the prior art, and an object of the present invention is to provide a system and a method for configuring an MOB_NBR-ADV message in a broadband wireless access communication system, which can reduce the size of the MOB_NBR-ADV message.

A further object of the present invention is to provide a system and a method for efficiently using radio channel resources in a broadband wireless access communication system.

In order to accomplish these objects, in accordance with one aspect of the present invention, there is provided a method for configuring a MOB_NBR-ADV message in a broadband wireless access communication system including a serving BS which broadcasts neighbor BS information to an MS, the method including adding a specific field, which represents whether at least one information field constituting the MOB_NBR-ADV message exists, to the MOB_NBR-ADV message; deciding if at least one information field is included in the MOB_NBR-ADV message; and determining a bit value of the specific field according to whether at least one information field is included in the MOB_NBR-ADV message.

In accordance with another aspect of the present invention, there is provided a system for configuring a MOB_NBR-ADV message in a broadband wireless access communication system including a serving BS which broadcasts neighbor BS information to an MS, the system including a serving BS for adding a specific field, which represents whether at least one information field constituting the MOB_NBR-ADV message exists, to the MOB_NBR-ADV message, deciding if at least one information field is included in the MOB_NBR-ADV message, and determining a bit value of the specific field according to whether at least one information field is included in the MOB_NBR-ADV message.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. It should be noted that similar components are designated by similar reference numerals although they are illustrated in different drawings. Also, in the following description, a detailed description of known functions and configurations incorporated herein will be omitted when it may obscure the subject matter of the present invention.

The present invention proposes a method for newly configuring an MOB_NBR-ADV message in a broadband wireless access communication system. To be specific, whenever a BS periodically broadcasts the MOB_NBR-ADV message, it determines what information fields are to be included in the MOB_NBR-ADV message, and adds to a new field information about whether the information fields exist in order to clarify the information according to the above determination.

Referring again to the conventional MOB_NBR-ADV message of FIGS. 2A and 2B, prior to a description of the present invention, an Operator ID field is a field indicating an inherent ID of a BS which transmits the MOB_NBR-ADV message. However, the Operator ID is information which an MS has already recognized through a network entry procedure previously conducted with a serving BS in which the MS is currently located. Thus, the Operator ID is not information which the serving BS must periodically transmit to the MS.

Also, in the conventional MOB_NBR-ADV message, the Neighbor BS-ID field is included in the message while a bit value of the Skip-Optional-Fields Flag is set to '0' only when a physical layer scheme of a network is an OFDMA scheme. Thus, a broadband wireless access communication system employing an OFDM or single carrier scheme does not include the Neighbor BS-ID field while the bit value of the Skip-Optional-Fields Flag is set to '1'.

Moreover, in the conventional MOB_NBR-ADV message, the HO Process Optimization field need not be necessarily included in the message because there may be a case in which a serving BS cannot support handover to some neighbor BSs.

Furthermore, in the conventional MOB_NBR-ADV message, fields related to QoS (Quality of Service)s (i.e., Scheduling Service Supported, Available Radio Resource and Handover neighbor Preference fields) are not supportable by all BSs. Even if any BS is capable of supporting the QoS relation information, it cannot always provide the information in a case where it is impossible for the BS to collect neighbor BS information in real-time.

In conclusion, the aforementioned fields can be omitted from the MOB_NBR-ADV message, and each BS, that is, each network operator, can reduce the length of the MOB_NBR-ADV message by properly inserting or omitting the omissible fields into or from the MOB_NBR-ADV message according to the present invention.

An MOB_NBR-ADV message format newly proposed in the present invention will be described with reference to FIGS. 3A to 3D, which illustrate the new MOB_NBR-ADV message format in accordance with a preferred embodiment of the present invention.

Referring to FIGS. 3A to 3D, first, the new MOB_NBR-ADV message includes an NBR-FLAG field which is added to the conventional MOB_NBR-ADV message. Although the size of the NBR_FLAG field is specified by 8 bits in this embodiment of the present invention, it should be noted that a network operator may appropriately change the size according to system situations. In the following description, it is assumed that the NBR_FLAG field has a size of 8 bits.

In the added NBR_FLAG field of 8 bits, its first 4 bits are used for clarifying whether specific fields exist in the MOB_NBR-ADV message, and its last 4 bits are reserved bits available for future function extension.

The 4 bits in the NBR_FLAG, which are used for clarifying whether specific fields exist in the MOB_NBR-ADV message, may be configured as follows:

Bit [0]: is located in the first place of the 8 bits in the NBR_FLAG field, and informs whether the Operator ID field is included in the MOB_NBR-ADV message. For example, if a value of bit [0] is '0', this means that the Operator ID field is included in the MOB_NBR-ADV message. Otherwise, if a value of bit [0] is '1', this means that the Operator ID field is not included in the MOB_NBR-ADV message.

Bit [1]: is located in the second place of the 8 bits in the NBR_FLAG field, and informs whether the Neighbor BS-ID field is included in the MOB_NBR-ADV message. For example, if a value of bit [1] is '0', this means that the Neighbor BS-ID field is included in the MOB_NBR-ADV message. Otherwise, if a value of bit [1] is '1', this means that the Neighbor BS-ID field is not included in the MOB_NBR-ADV message.

Bit [2]: is located in the third place of the 8 bits in the NBR_FLAG field, and informs whether the HO Process Optimization field is included in the MOB_NBR-ADV message. For example, if a value of bit [2] is '0', this means that the HO Process Optimization field is included in the MOB_NBR-ADV message. Otherwise, if a value of bit [2] is '1', this means that the HO Process Optimization field is not included in the MOB_NBR-ADV message.

Bit [3]: is located in the fourth place of the 8 bits in the NBR_FLAG field, and informs whether QoS related fields are included in the MOB_NBR-ADV message. For example, if a value of bit [3] is '0', this means that the QoS related fields are included in the MOB_NBR-ADV message. Otherwise, if a value of bit [3] is '1', this means that the QoS related fields are not included in the MOB_NBR-ADV message.

Here, the QoS related fields included in the MOB_NBR-ADV message refer to the Scheduling Service Supported field, the Available Radio resource field and the Handover Neighbor Preference field.

Besides the aforementioned bits, bits [4] to [7] are reserved bits.

For example, if the NBR_FLAG field has a value of '1001 0000', this means that the Operator ID field and the QoS related fields do not exist, but the Neighbor BS-ID field and the HO Process Optimization field exist in the MOB_NBR-ADV message.

As stated above, by removing unnecessary fields from the MOB_NBR-ADV message and clarifying the presence/absence of the fields in the NBR_FLAG field, the size of the MOB_NBR-ADV message can be reduced. That is, it is possible to configure an MOB_NBR-ADV message having flexibility in size (length). In addition, a serving BS may configure and transmit the new MOB_NBR-ADV message according to the present invention every single period or every several periods. That is, when information fields constituting an MOB_NBR-ADV message to be transmitted in a current period must be configured differently from those transmitted in a previous period, the serving BS can newly configure and transmit the MOB_NBR-ADV message according to the preferred embodiment of the present invention.

Now, a process of setting up the NBR_FLAG field of the MOB_NBR-ADV message will be described with reference to FIG. 4, which is a flowchart illustrating the process of setting up the NBR_FLAG field when the MOB_NBR-ADV message is configured in accordance with a preferred embodiment of the present invention.

Figure 4:
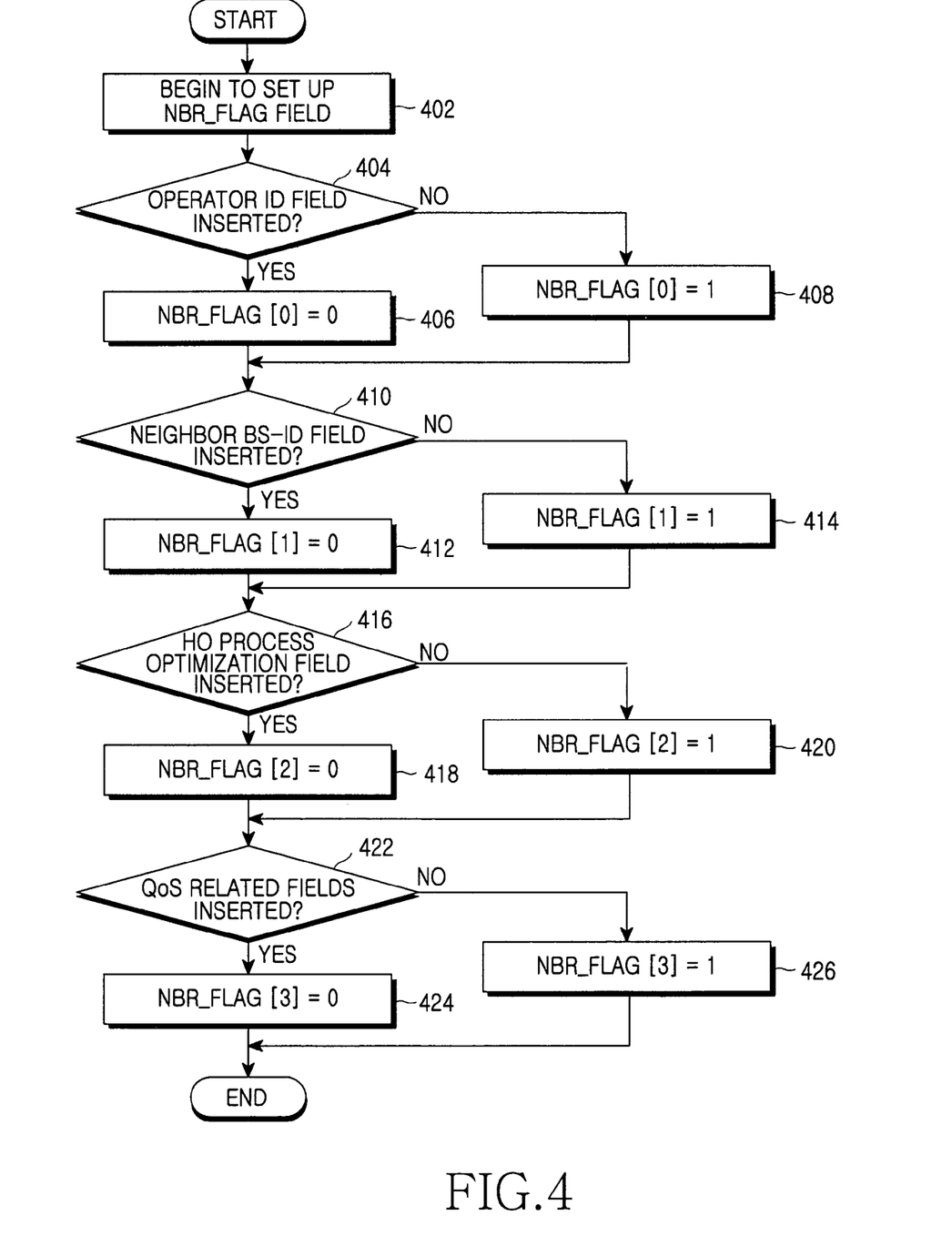
FIG. 4 is a flowchart illustrating a process of setting up an NBR_FLAG field when the MOB_NBR-ADV message is configured in accordance with a preferred embodiment of the present invention.

Referring to FIG. 4, a serving BS must configure first the MOB_NBR-ADV message according to the preferred embodiment of the present invention in order to periodically transmit the MOB_NBR-ADV message. Thus, in step 402, the serving BS begins to set up an NBR_FLAG field in the MOB_NBR-ADV message, and proceeds to step 404. In step 404, the serving BS determines if an Operator ID field is inserted into the MOB_NBR-ADV message. According to is the determination made in step 404, the serving BS proceeds to step 406 when the Operator ID field is inserted into the MOB_NBR-ADV message, or proceeds to step 408 when the Operator ID field is not inserted.

In step 406, the serving BS sets to 'NBR_FLAG [0]=0', which means that the MOB_NBR-ADV message includes the Operator ID field, and proceeds to step 410. In step 408, the serving BS sets to 'NBR_FLAG [0]=1', which means that the MOB_NBR-ADV message does not include the Operator ID field, and proceeds to step 410.

In step 410, the serving BS determines if a Neighbor BS-ID field is inserted into the MOB_NBR-ADV message. According to is the determination made in step 410, the serving BS proceeds to step 412 when the Neighbor BS-ID field is inserted into the MOB_NBR-ADV message, and proceeds to step 414 when the Neighbor BS-ID field is not inserted.

In step 412, the serving BS sets to 'NBR_FLAG [1]=0', which means that the MOB_NBR-ADV message includes the Neighbor BS-ID field, and proceeds to step 416. In step 414, the serving BS sets to 'NBR_FLAG [1]=1', which means that the MOB_NBR-ADV message does not include the Neighbor BS-ID field, and proceeds to step 416.

In step 416, the serving BS determines if an HO Process Optimization field is inserted into the MOB_NBR-ADV message. According to the determination made in step 416, the serving BS proceeds to step 418 when the HO Process Optimization field is inserted into the MOB_NBR-ADV message, and proceeds to step 420 when the HO Process Optimization field is not inserted.

In step 418, the serving BS sets to 'NBR_FLAG [2]=0', which means that the MOB_NBR-ADV message includes the HO Process Optimization field, and proceeds to step 422. In step 420, the serving BS sets to 'NBR_FLAG [2]=1', which means that the MOB_NBR-ADV message does not include the HO Process Optimization field, and proceeds to step 422.

In step 422, the serving BS determines if QoS related fields are inserted into the MOB_NBR-ADV message. According to is the determination made in step 422, the serving BS proceeds to step 424 when the QoS related fields are inserted into the MOB_NBR-ADV message, and proceeds to step 426 when the QoS related fields are not inserted.

In step 424, the serving BS sets to 'NBR_FLAG [3]=0', which means that the MOB_NBR-ADV message includes the QoS related fields or, in step 426, the serving BS sets to 'NBR_FLAG [3]=1', which means that the MOB_NBR-ADV message does not include the QoS related fields, and completes the setup of the NBR_FLAG field.

Although information fields, which may not be included in the MOB_NBR-ADV message, are limited to the Operator ID field, the Neighbor BS-ID field, the HO Process Optimization field and the QoS related fields in the description of FIG. 4, these are merely one example. That is, it should be understood that a network operator may configure the new MOB_NBR-ADV message by using other information fields in combination with those stated above. It should be also noted that new information fields constituting the MOB_NBR-ADV message may be added and extended.

As described above, since a field, which informs whether specific information fields are included in neighbor BS information broadcast message, that is, an MOB_NBR-ADV message, is newly added to the message, and omissible information fields are omitted according to the circumstances of a BS in the present invention, the MOB_NBR-ADV message can be flexibly configured. Therefore, there is an advantage in that the size of the MOB_NBR-ADV message is reduced as compared with that of the existing MOB_NBR-ADV message and thus radio channel resources can be efficiently utilized.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting a neighbor base station advertisement (MOB_NBR-ADV) message by a base station (BS) in a broadband wireless access communication system, the method comprising: transmitting the MOB_NBR-ADV message, wherein the MOB_NBR-ADV message includes a first field including m bits, where m is an integer greater than or equal to 1, wherein when m information fields can be included in the MOB_NBR-ADV message, the m bits indicate whether any of the m information fields may be omitted from the MOB_NBR-ADV message, respectively; and wherein, when a value of one of the m bits indicates that one of the m information fields may be omitted, the one of the m information fields is omitted from the MOB_NBR-ADV message, and when the value of the one of the m bits indicates that the one of the m information fields may not be omitted, the one of m information fields is not omitted from the MOB_NBR-ADV message.

2. The method as claimed in claim 1, wherein the m information fields include an Operator identifier (ID) field indicating an inherent ID of the BS.

3. The method as claimed in claim 1, wherein the m information fields include a neighbor BS identifier (Neighbor BS-ID) field.

4. The method as claimed in claim 1, wherein the m information fields include a handover (HO) process optimization field for indicating indispensable procedures and omissible procedures during handover to a neighbor BS.

5. The method as claimed in claim 1, wherein the m information fields include a quality of service (QoS) related field for indicating a QoS class that is supported by a neighbor BS.

6. A system for transmitting a neighbor base station advertisement (MOB_NBR-ADV) message in a broadband wireless access communication system, the system comprising:
a base station (BS) for transmitting the MOB_NBR-ADV message,
wherein the MOB_NBR-ADV message includes a first field including m bits, where m is an integer greater than or equal to 1, and
wherein when m information fields can be included in the MOB_NBR-ADV message, the m bits indicate whether any of the m information fields may be omitted from the MOB_NBR-ADV message, respectively.

7. The system as claimed in claim 6, wherein the m information fields comprise an Operator identifier (ID) field indicating an inherent ID of the BS.

8. The system as claimed in claim 6, wherein the m information fields comprise a neighbor BS identifier (Neighbor BS-ID) field.

9. The system as claimed in claim 6, wherein the m information fields comprise a handover (HO) process optimizer (HO Process Optimization) field for indicating indispensible procedures and omissible procedures during handover to a neighbor BS.

10. The system as claimed in claim 6, wherein the m information fields comprise a quality of service (QoS) related field for indicating a QoS class that is supportable by a neighbor BS.

* * * * *